(12) United States Patent
Plesternings

(10) Patent No.: US 6,799,788 B2
(45) Date of Patent: Oct. 5, 2004

(54) DECKLID MECHANISM FOR VEHICLE WITH RETRACTABLE TOP

(75) Inventor: Frank Plesternings, Highland, MI (US)

(73) Assignee: SSR Roofing Systems, LLC, Plymouth, MI (US)

( * ) Notice: Subject to any disclaimer, the term of this patent is extended or adjusted under 35 U.S.C. 154(b) by 0 days.

(21) Appl. No.: 10/408,401

(22) Filed: Apr. 7, 2003

(65) Prior Publication Data

US 2003/0218354 A1 Nov. 27, 2003

Related U.S. Application Data

(60) Provisional application No. 60/370,838, filed on Apr. 8, 2002.

(51) Int. Cl.[7] .................................................. B60J 7/20
(52) U.S. Cl. ................ 296/107.08; 296/76; 296/136.06
(58) Field of Search ............................. 296/107.08, 76, 296/136.06

(56) References Cited

FOREIGN PATENT DOCUMENTS

| DE | 19746569 A1 | 5/1999 |
|---|---|---|
| DE | 19851181 A1 | 11/1999 |
| JP | 5 112256 | 5/1993 |
| JP | 2003104062 A2 | 4/2003 |

Primary Examiner—Joseph D. Pape
(74) Attorney, Agent, or Firm—Gifford, Krass, Groh, Sprinkle, Anderson & Citkowski, PC

(57) ABSTRACT mechanisms each have an upper portion interconnected with the forward end of the decklid and a lower portion interconnected with the vehicle body. The front articulation mechanisms each have a latched position wherein the upper and lower portions are latchedly interconnected and an unlatched position wherein the upper and lower portions are separable. The upper portion includes a multilink hinge having a retracted position and an extended position. A rear articulation mechanism has an upper portion interconnected with the rearward end of the deck and a lower portion interconnected with the vehicle body. The rear articulation mechanism has a latched position wherein the upper and lower portions are latchedly interconnected and an unlatched position wherein the upper and lower portions are separable. The lower portion includes a multilink hinge having a retracted position and an extended position.

24 Claims, 9 Drawing Sheets

DECKLID MECHANISM FOR VEHICLE WITH RETRACTABLE TOP

REFERENCE TO RELATED APPLICATIONS

This patent application claims benefit from U.S. provisional patent application Ser. No. 60/370,838, filed Apr. 8, 2002, the contents of which are incorporated in its entirety herein by reference.

FIELD OF THE INVENTION

The present invention relates generally to vehicle closures and, more specifically, to an articulating decklid for a vehicle with a retractable top.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moon roofs are some of the simplest designs, and offer the opportunity to open a portion of the vehicle roof for increased airflow. More complicated designs allow the entire roof structure to be retracted and stored behind the passenger compartment. When retracted, these roof designs form a roof stack to the rear of the passenger compartment. In some designs, a storage area is provided just rearwardly of the passenger compartment and forwardly of the vehicle luggage compartment. A soft or hard cover is sometimes provided for covering the roof stack in the stored position. In other designs, the retracted roof is stored in the vehicle luggage compartment. This approach is especially useful with retractable hard top designs. In one approach, the vehicle has a decklid that articulates rearwardly to provide a forward facing opening behind the passenger compartment to receive the retracted roof structure. The decklid may then be articulated back into the closed position to cover the top stack. This gives the vehicle a finished appearance when the roof is retracted. Most consumers prefer that the trunk also be usable in a traditional manner, wherein the rear end of the decklid opens to provide a rearwardly facing opening to receive luggage or groceries. Providing a decklid that will articulate so as to provide a forward-facing opening to receive a retractable roof structure and to also open in a traditional manner to provide a rearward facing opening presents numerous mechanical challenges.

One approach to providing an articulated decklid that opens both rearwardly and forwardly, is to provide a frame which supports the decklid and provides for interconnection with the body. The frame typically articulates with the decklid when it moves in one direction and remains stationary when the decklid articulates in the other direction. The decklid then latches and pivots with respect to the frame in some positions. Examples of designs using a frame are illustrated in the following patents: U.S. Pat. Nos. 5,775,766, 5,823,606, 6,010,178, 6,164,713, 6,186,577, 6,270,144, 6,325,445, and U.S. Pat. Publication No. 2003/0020300 A1. Designs with frames, while functional, add significant cost and weight to vehicle designs. An alternative approach has been to provide frameless decklid designs. However, these designs typically include a complicated articulation mechanism that remains attached to both the decklid and the body in all positions of the decklid. Examples of these systems are shown in the following patents: U.S. Pat. Nos. 6,193,300 and 6,352,298, and U.S. Pat. Publication No. 2002/0093218. As will be appreciated by those of skill in the art, these systems are very complicated and the articulation mechanisms are heavy and expensive. In light of this, there remains a need for improved decklid articulation systems.

SUMMARY OF THE INVENTION

The present invention provides an improved articulating decklid system. In one embodiment, a frameless articulating decklid system is designed for a vehicle with a body and a retractable roof selectively covering a passenger compartment disposed in the body. The vehicle has a luggage storage compartment positioned rearward of the passenger compartment and disposed in the body. The luggage compartment has a forward end and a rearward end. The decklid system includes a decklid with a forward and a rearward end. A pair of front articulation mechanisms each have an upper portion interconnected with the forward end of the decklid and a lower portion interconnected with the vehicle body. The front articulation mechanisms each have a latched position wherein the upper and lower portions are latchedly interconnected and an unlatched position wherein the upper and lower portions are separable. The upper portion includes a multilink hinge having a retracted position and an extended position. A rear articulation mechanism has an upper portion interconnected with the rearward end of the deck and a lower portion interconnected with the vehicle body. The rear articulation mechanism has a latched position wherein the upper and lower portions are latchedly interconnected and an unlatched position wherein the upper and lower portions are separable. The lower portion includes a multilink hinge having a retracted position and an extended position. The decklid system has a first closed position wherein the front and rear actuation mechanisms are each in the latched position, the forward end of the decklid is adjacent the forward end of the luggage compartment, and the rearward end of the decklid is adjacent the rearward end of the luggage compartment. The decklid system has a second top receiving position wherein the front articulation mechanisms are in the unlatched position and the rear articulation mechanisms is in latched position. The multilink hinge of the rear articulation system is in the extended position such that the forward end of the decklid is spaced from the vehicle body so as to define a generally forward facing opening to receive the retractable roof. The decklid has a third luggage receiving position wherein the front articulation mechanisms are in the latched position and the rear articulation mechanism is in the unlatched position. The multilink hinge of each of the front articulation mechanisms is in the extended position such that the rearward end of the decklid is spaced from the vehicle body so as to define a generally rearward facing opening to receive luggage.

DETAILED DESCRIPTION OF THE PREFERRED EMBODIMENTS

Figure 1:
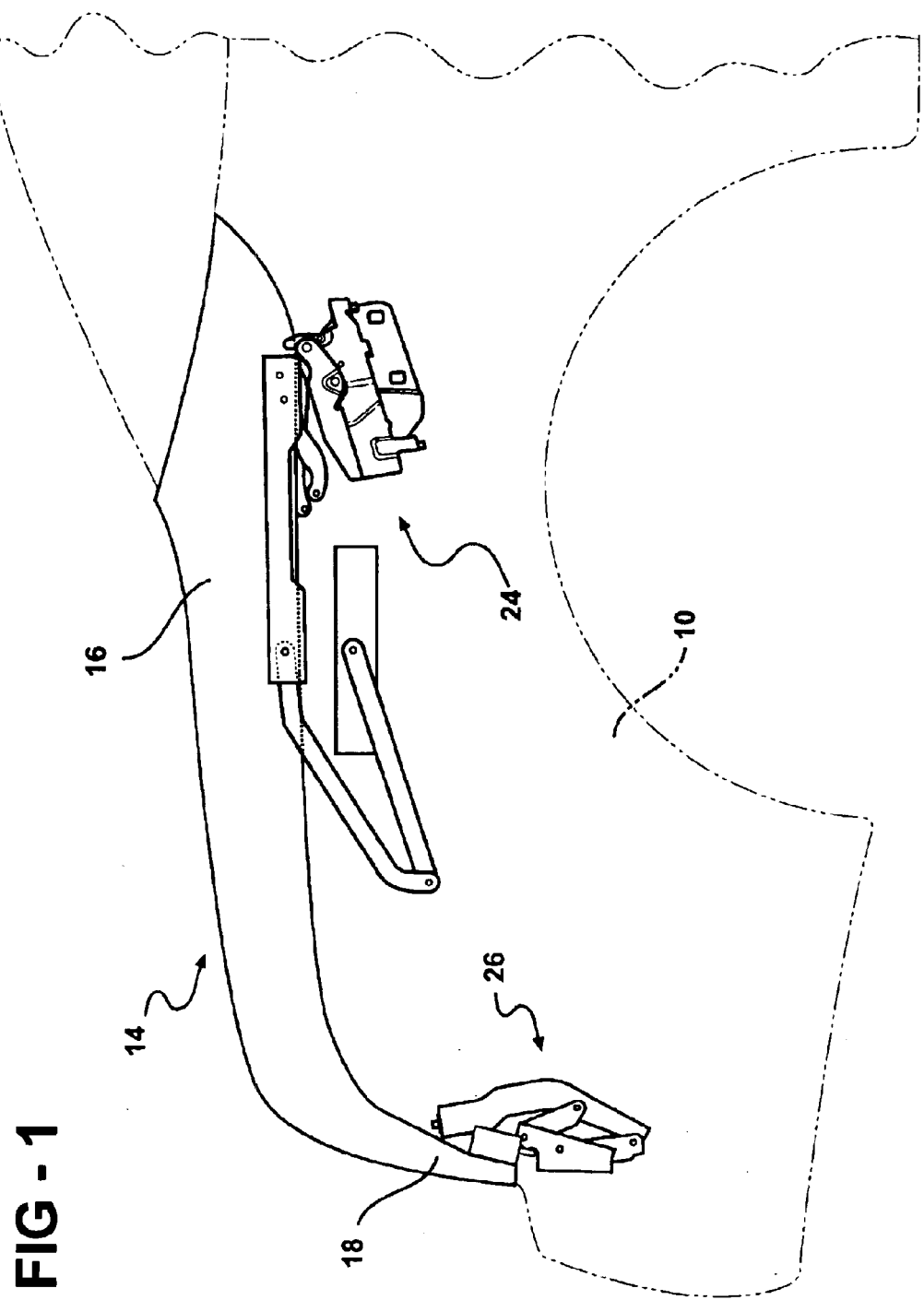
FIG. 1 is a side elevational view of a portion of a vehicle including a decklid and decklid articulation system according to the present invention.
Figure 2:
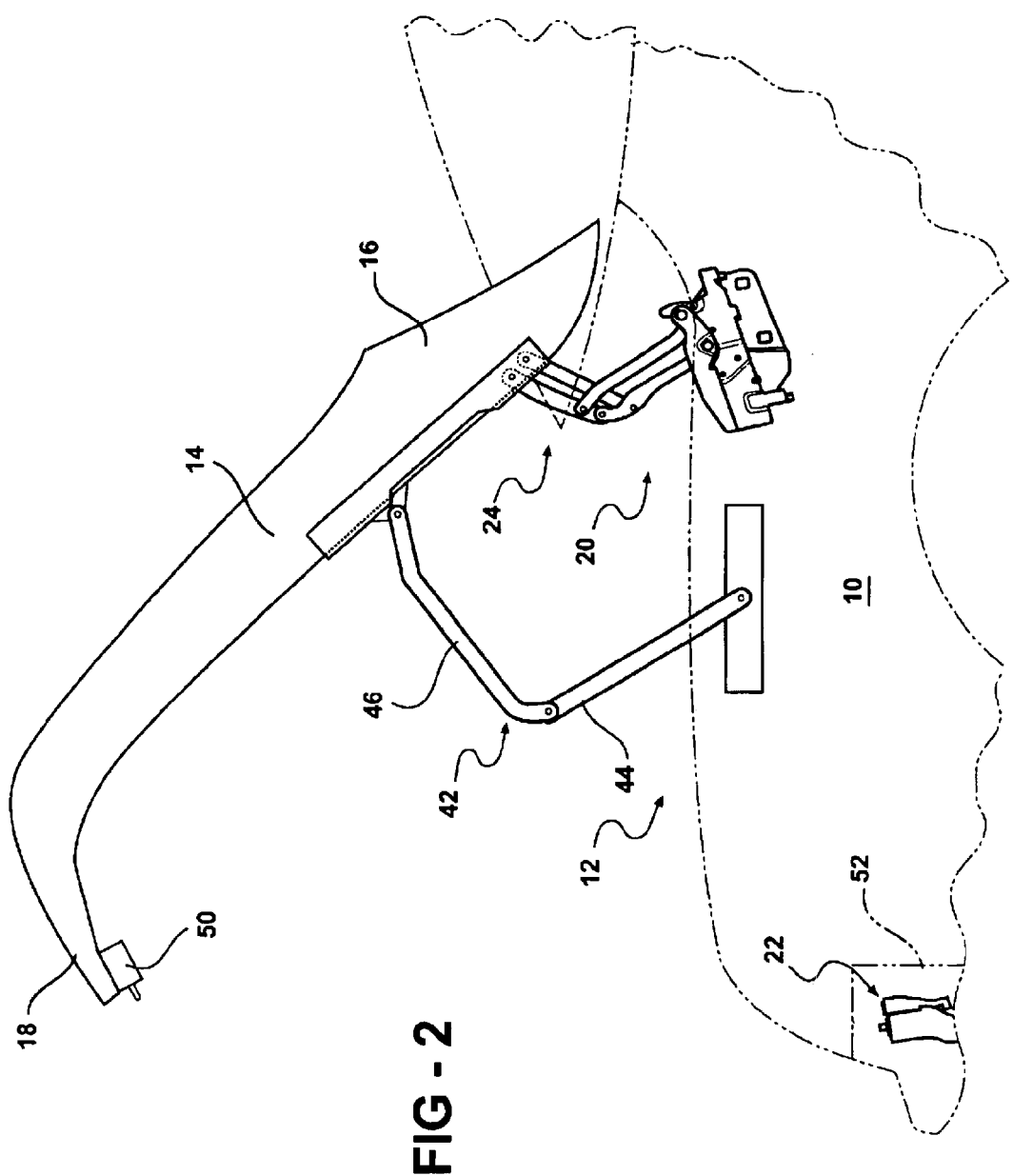
FIG. 2 is a side elevational view similar to FIG. 1, with the decklid shown in a luggage receiving position.
Figure 3:
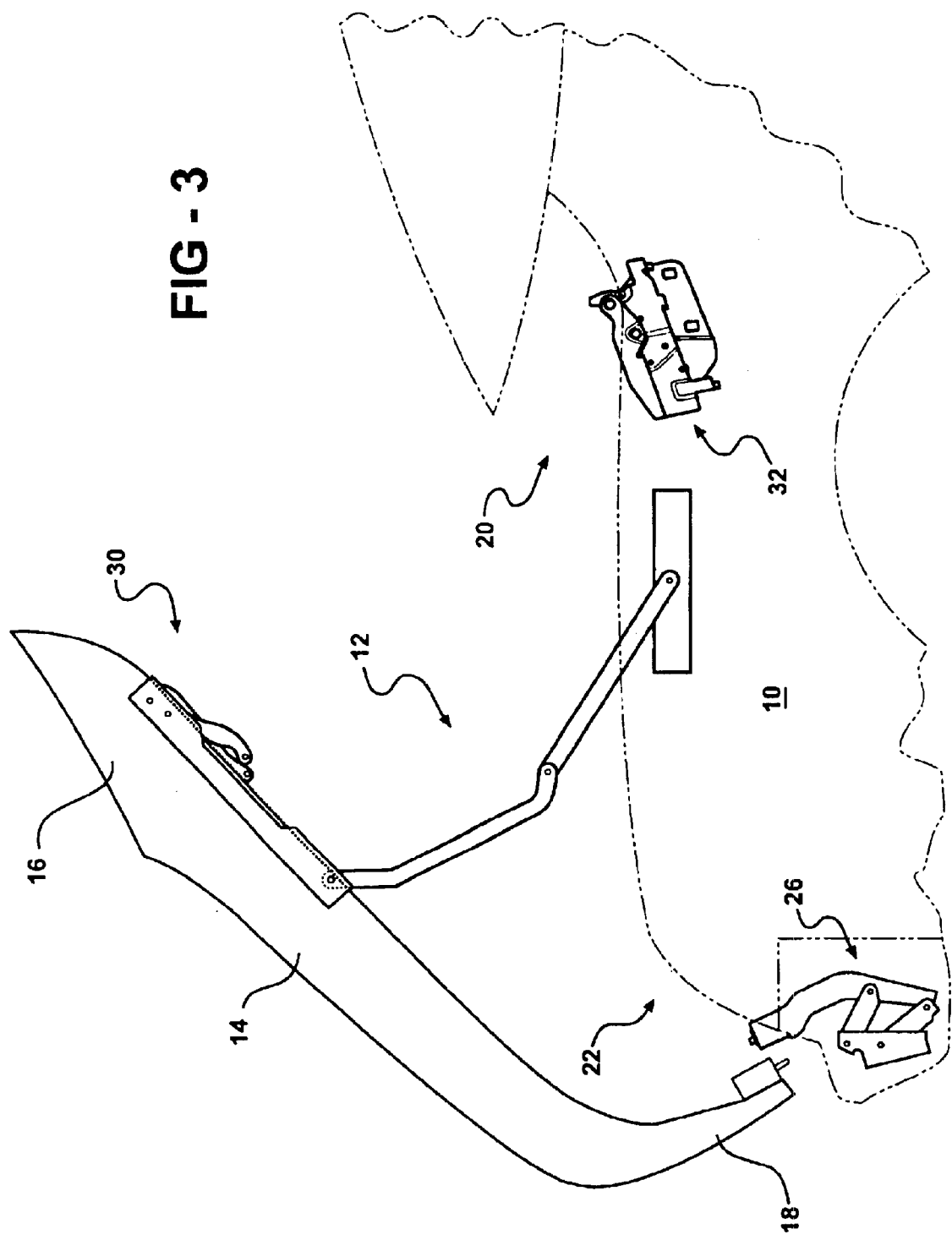
FIG. 3 is view similar to FIGS. 1 and 2, with the decklid shown in a top receiving position.

FIGS. 1–3 illustrate an articulating decklid system according to the present invention in its three design positions. The system is designed for use with the vehicle having a body 10 with a luggage compartment 12 which is selectively covered by a decklid 14. The decklid 14 is preferably a single piece decklid and may be said to have a forward end 16 and a rearward end 18. The luggage compartment 12 may also be said to have a forward end 20 and a rearward end 22, corresponding to the like-named portions of the decklid 14. A pair of front articulation mechanisms 24 are provided for selectively interconnecting the forward end 16 of the decklid 14 with the vehicle body 10. One front articulation mechanism is preferably provided on each side of the decklid 14 at its forward end 16. A rear articulation mechanism selectively interconnects the rearward end 18 of the decklid with the vehicle body 10. Preferably, a single rear articulation mechanism 26 is provided intermediate to the two sides of the vehicle.

FIG. 1 illustrates the decklid system in its closed position. In this position, the forward end 16 of the decklid 14 is adjacent the forward end 20 of the luggage compartment and the rearward end 18 of the decklid is adjacent the rearward end 22 of the luggage compartment. FIG. 2 illustrates the decklid in a luggage receiving position. In this position, the rear articulation mechanism 26 unlatches, allowing the rearward end 18 of the decklid 14 to swing upwardly to define a rearward facing opening to receive luggage into the luggage compartment. FIG. 3 illustrates the decklid system in a top receiving position. In this position, the front articulation mechanisms are each unlatched, allowing the forward end 16 of the decklid 14 to swing upwardly so as to define a generally forward facing opening to receive the vehicle top into the luggage compartment 12.

Figure 4:
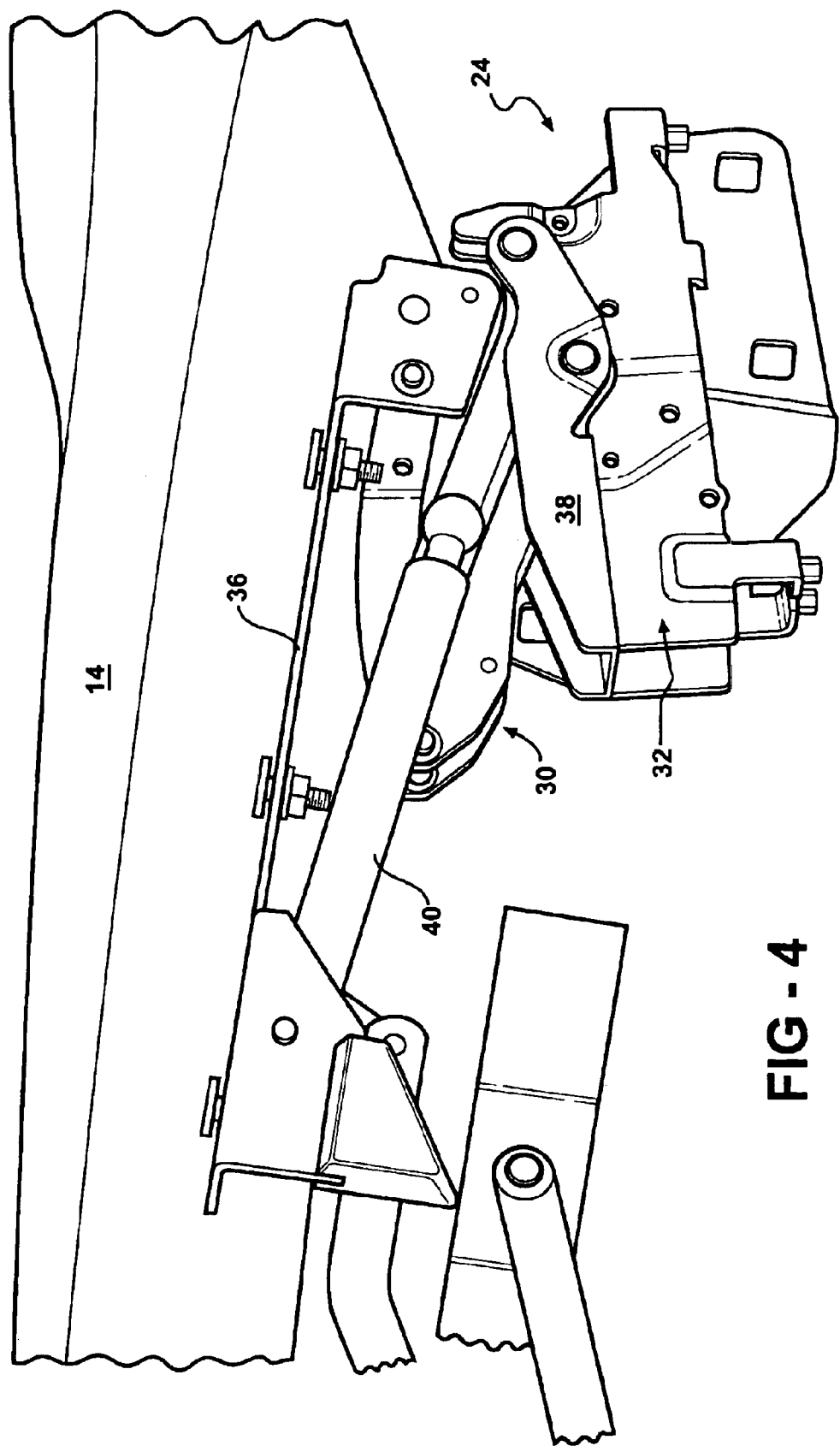
FIG. 4 is a perspective view of a portion of a decklid and a front articulation mechanism for use with the present invention.
Figure 5:
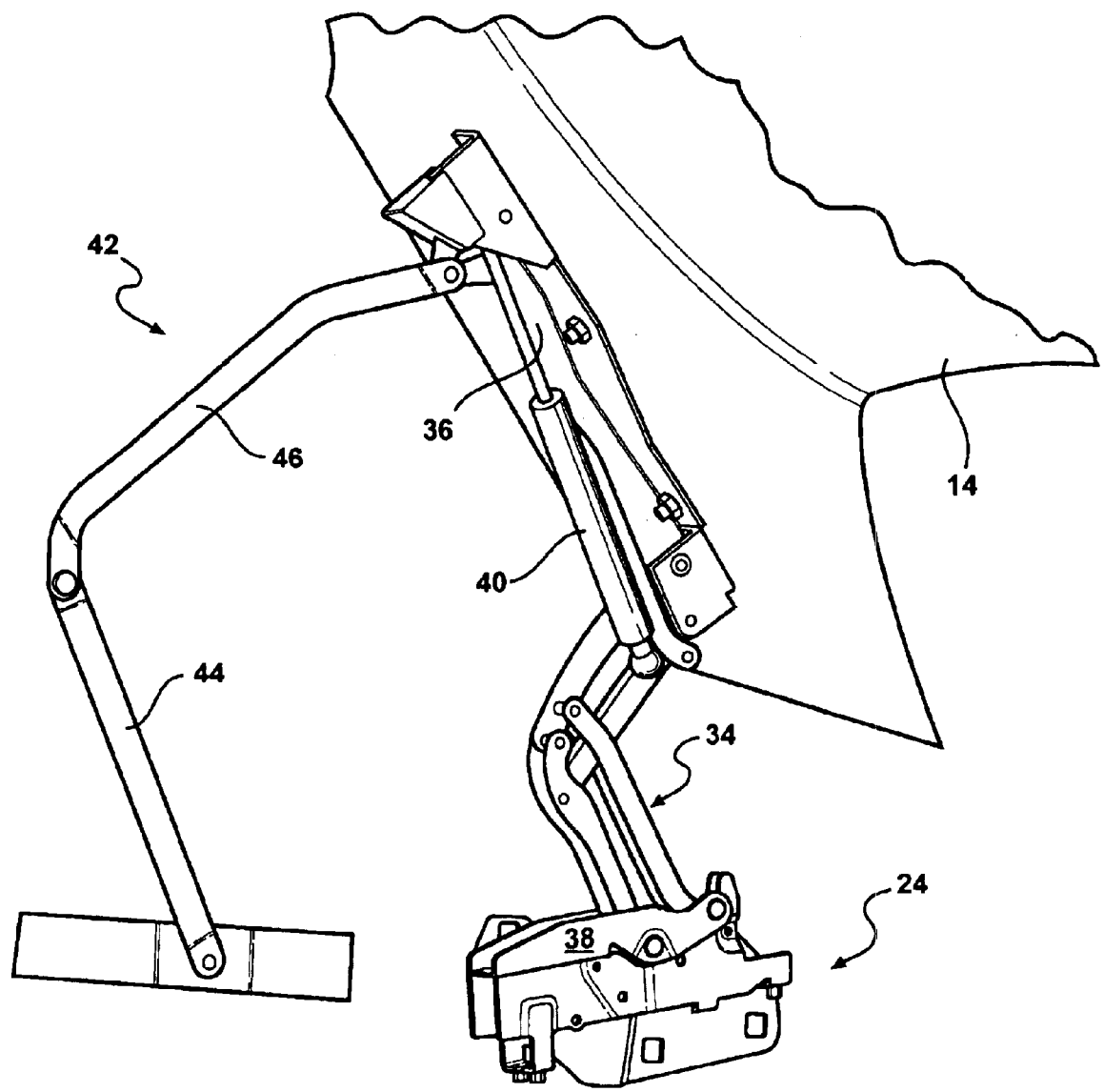
FIG. 5 is a perspective view of a front articulation mechanism with the hinge portion in an extended position so as to open the decklid and the rear end.
Figure 6:
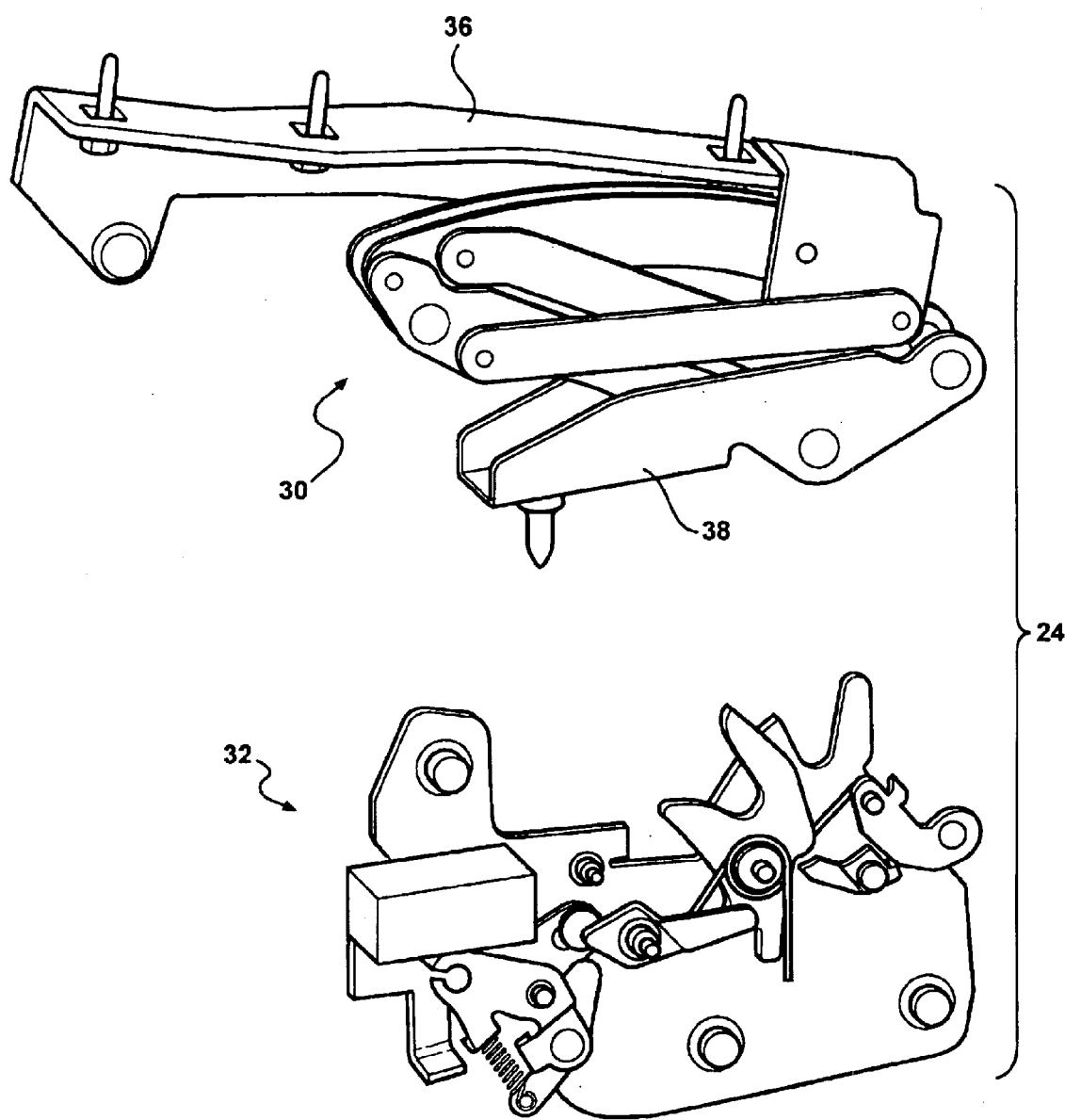
FIG. 6 is a perspective view of a front articulation mechanism for use with the present invention, with the upper and lower portions unlatched and separated.

Referring now to FIGS. 4–6, a front articulation mechanism 24 is shown in more detail. FIG. 4 illustrates the front articulation mechanism 24 as viewed from the mid-line of the vehicle, with a portion of the decklid 14 shown. The front articulation mechanism 24 and decklid 14 are shown in the closed position, corresponding to FIG. 1. FIG. 5 illustrates a portion of the decklid 14 and the front articulation mechanism 24 in the luggage receiving position, corresponding to FIG. 2. FIG. 6 illustrates an embodiment of the front articulation mechanism 24 with the upper portion 30 and the lower portion 32 separated, as occurs when the system moves to the top receiving position of FIG. 3. The front articulation mechanisms 24 have latched position, as shown in FIG. 4, wherein the upper portion 30 and lower portion 32 are latchedly interconnected. FIG. 6 illustrates the front articulation mechanism 24 in the unlatched position, wherein the upper portion 30 and lower portion 32 are separable. As shown, when the upper portion 30 and lower portion 32 of the mechanism 24 are unlatched and separated, they are completely disconnected and retain no mechanical communication or interconnection. In use, the upper portion 30 of the mechanism 24 is interconnected with the forward end 16 of the decklid 14, while the lower portion 32 is interconnected with the vehicle body. The upper portion 30 includes a multilink hinge mechanism 34. The hinge mechanism 34 interconnects a decklid attaching member 36 and a latch connecting member 38. As shown, the multilink hinge 34 preferably is a six-bar linkage.

FIGS. 4 and 5 illustrate one embodiment of an actuator 40 operable to move the hinge mechanism 34 between the retracted position shown in FIG. 4 and the extended position shown in FIG. 5. The actuator 40 preferably extends and retracts, and may be locked in the retracted position. This allows the upper portion 30 to be separated from the lower portion 32, with the actuator 40 retaining the hinge mechanism 34 in the retracted position as the upper portion 30 moves away from the lower portion 32. As shown, the actuator 40 extends between one of the links forming the multilink hinge mechanism 34 and a portion of the decklid attaching member 36. As will be clear to those of skill in the art, other mechanisms may be used for actuating the decklid from the closed position to the luggage receiving position. Also, other approaches may be used to retaining the upper hinge mechanism 34 in the retracted position when it is unlatched from the lower portion 32.

FIGS. 2 and 5 also illustrate a knee-linkage 42 which preferably extends between the body 10 and the decklid 14 so as to provide a routing path for vehicle wiring and other necessities. In this embodiment, the knee-linkage 42 is provided only on one side of the vehicle and does not assist in the articulation of the decklid 14. In the illustrated embodiment, the knee-linkage 42 has a lower link 44 with its lower end interconnected with the body 10. An upper link 46 has a lower end interconnected with the other end of the lower link 44 and an upper end interconnected with the decklid attaching member 36.

Figure 7:
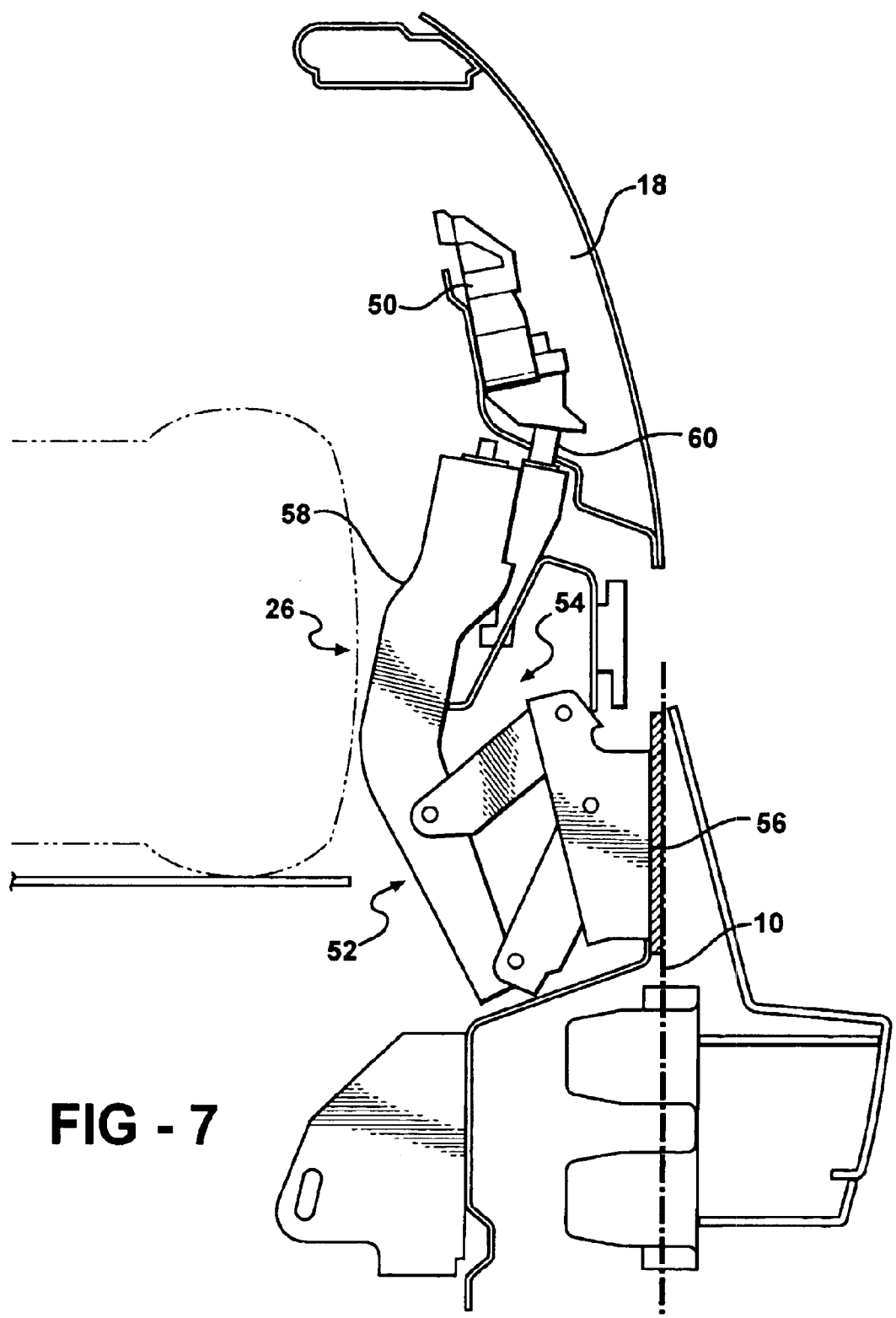
FIG. 7 is a side elevational view of a portion of a vehicle and a rear articulation mechanism for use with the present invention.
Figure 8:
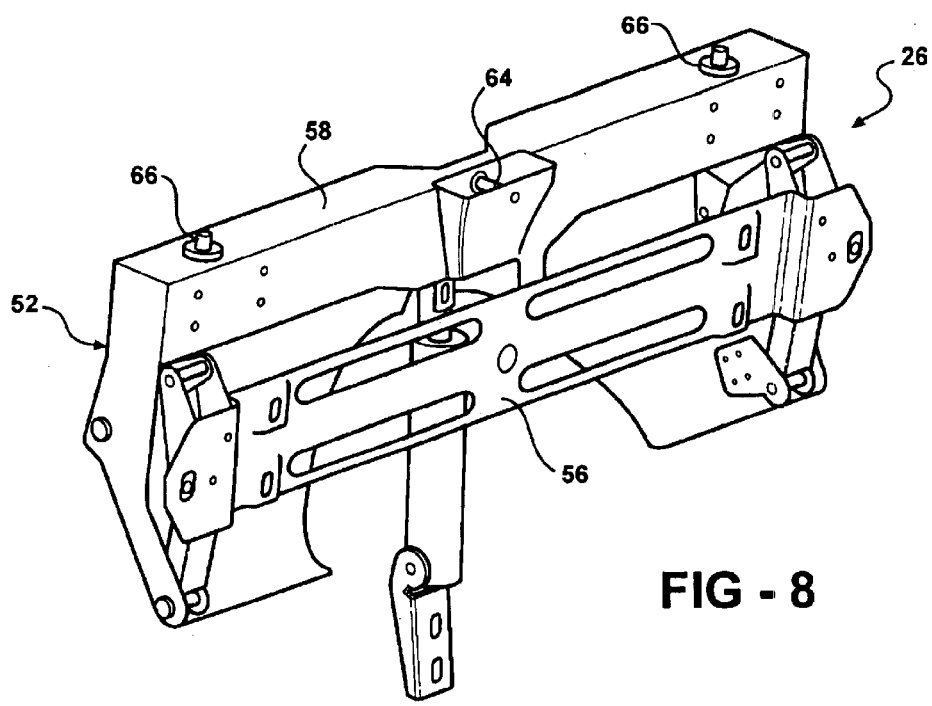
FIG. 8 is a perspective view of a rear articulation mechanism for use with the present invention.

FIGS. 7 and 8 illustrate the rear articulation mechanism 26 in more detail. FIG. 7 illustrates a side view with the rear articulation mechanism 26 assembled in the vehicle body, and interconnecting the rearward end 18 of the decklid 14 with the vehicle body. The rear articulation mechanism 26 includes an upper portion 50 which is interconnected with the rearward end 18 and the decklid 14 and a lower portion 52 which is interconnected with the vehicle body 10. FIG. 8 illustrates primarily the lower portion of 52. FIG. 7 shows the rear articulation mechanism in the latched position, wherein the upper portion 50 and lower portion 52 are latchedly interconnected. As with the front articulation mechanism, the upper and lower portions may be moved to an unlatched position wherein they are separable. FIG. 2 illustrates the upper portion 50 and the lower portion 52 in the unlatched and separated position. As with the front articulation mechanisms, when the upper portion 50 and lower portion 52 are separated, there is no mechanical communication between the two portions. The lower portion 52 preferably includes a multilink hinge mechanism 54, which interconnects a body connecting member 56 and a latch connecting member 58. Together, this forms a four-bar linkage. FIGS. 7 and 8 illustrate the hinge mechanism in the retracted or non-articulated position, while FIG. 3 illustrates the hinge mechanism in the extended or articulated position.

Figure 9:
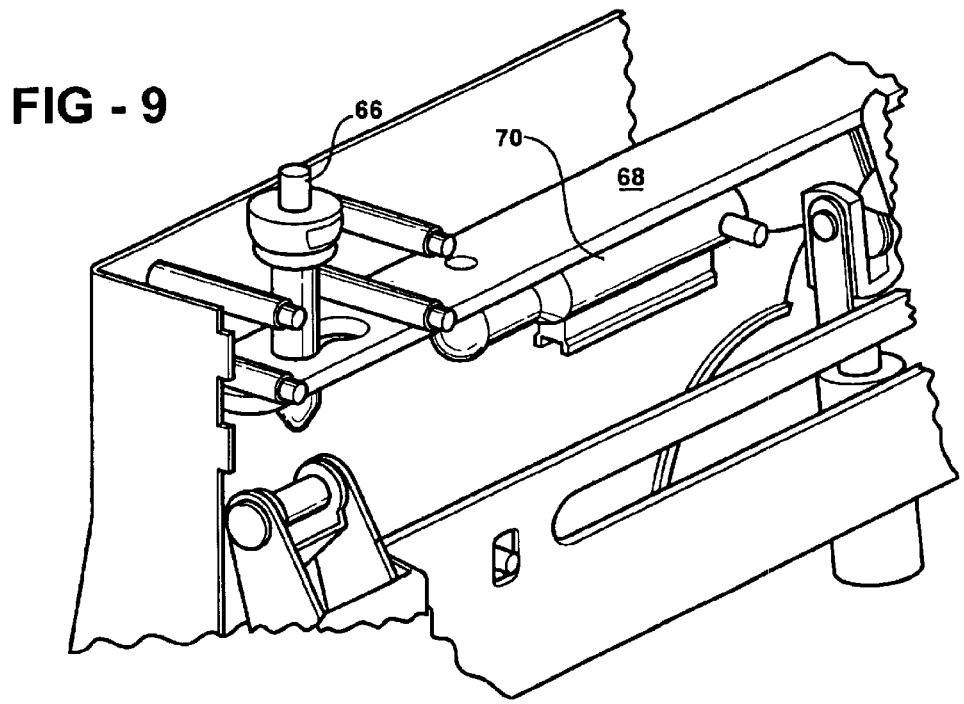
FIG. 9 is a detailed perspective view showing one embodiment of a latching system for interconnecting a decklid with the remainder of the rear articulation mechanism.

Preferably, the upper portion 50 of the rear articulation mechanism 26 includes a traditional decklid latch 60, which engages a latch bar 64 that forms part of the lower portion 52. Auxiliary latching is also preferably provided. FIG. 8 illustrates a pair of pin members 66 which preferably form part of the upper portion 50 or the rearward end 18 of the decklid. FIG. 9 illustrates one of these pin member 66 being locked into place by a sliding lock bar 68, which is moved between a locked and unlocked position by an actuator 70.

An actuator 72 preferably extends between the body and the latch connecting member 58 of the lower portion 52, and is operable to extend the hinge mechanism between the retracted position and extended position.

Figure 10:
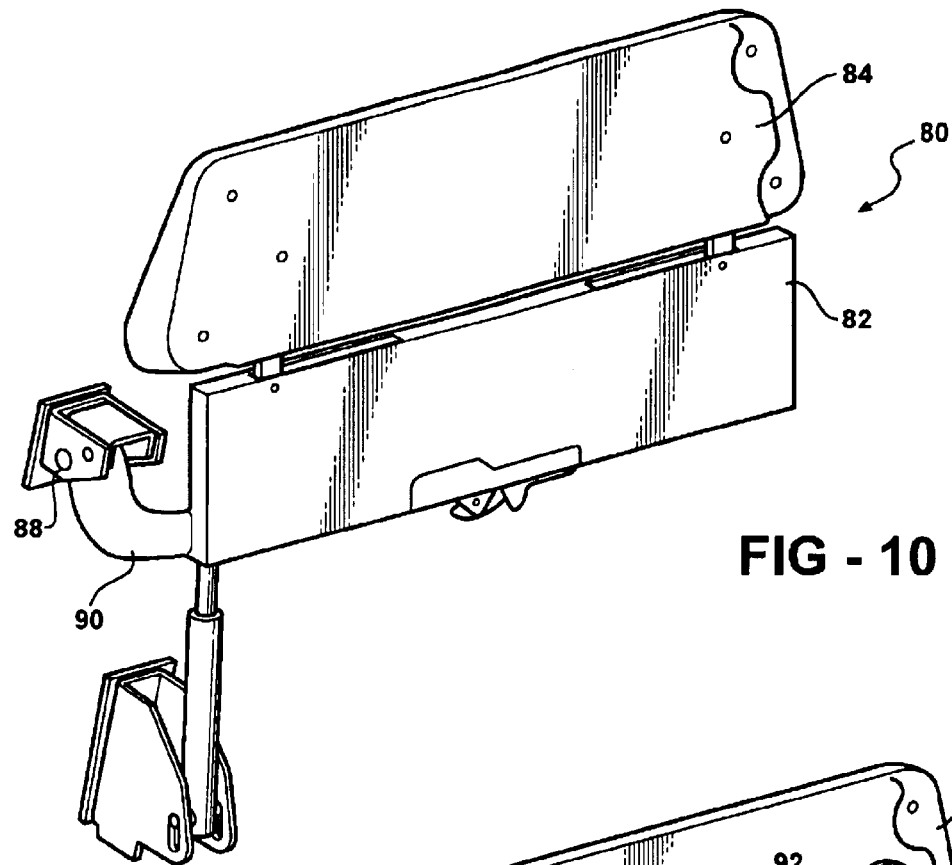
FIG. 10 is a perspective view of an alternative embodiment of a rear articulation mechanism for use with the present invention.
Figure 11:
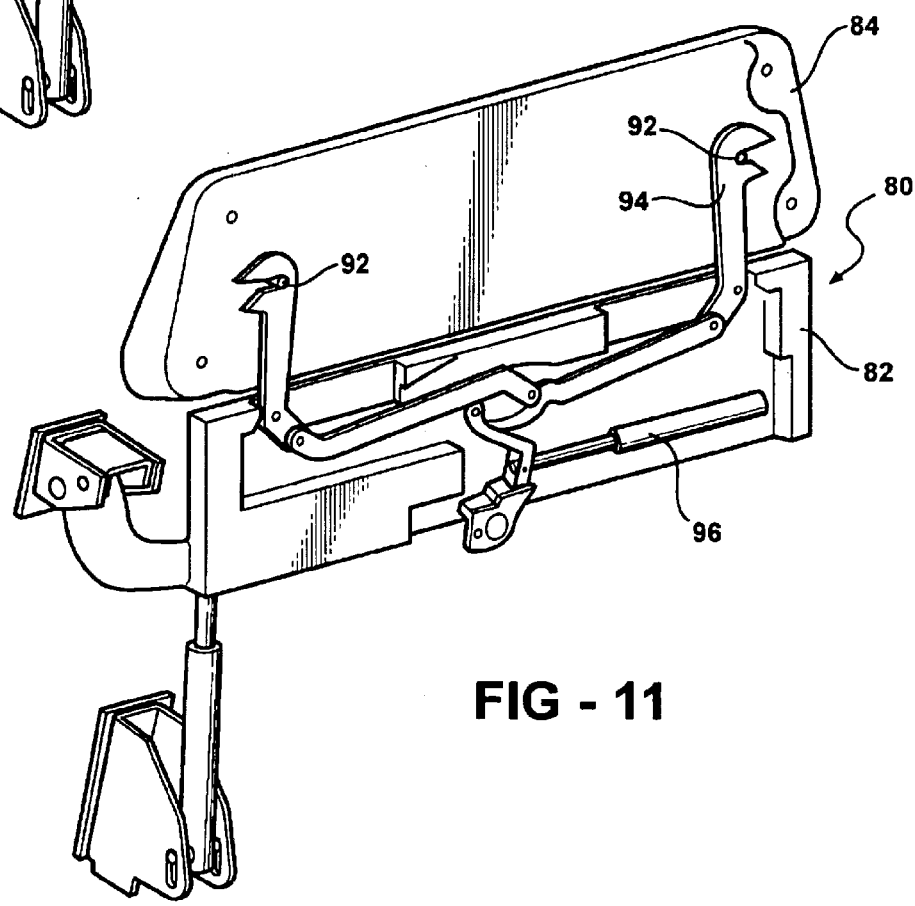
FIG. 11 is a perspective view of an articulation mechanism similar to FIG. 10, showing an alternative latching system.

FIG. 10 illustrates an alternative rear actuation mechanism 80 having a lower portion 82, and upper portion 84, and an actuator 86. While the preferred embodiment of the rear actuation mechanism includes a four-bar mechanism, this alternative embodiment provides for a single pivot hinge 88 with a gooseneck member 90 interconnecting the remainder of the lower portion 82 with the hinge 88. As with the prior embodiment, the rear actuation mechanism 80 has a latched position, as shown in FIG. 10, and an unlatched position wherein the upper and lower portions are separable. FIG. 11 illustrates a view of the mechanism 80 with covers removed to show an alternative latching mechanism for use with the present invention. This latching mechanism may also be used with the prior multilink rear actuation mechanism design. In this design, the upper portion 84 of the actuation mechanism 80 includes a pair of inwardly extending pins 92 which are selectively engaged by a pair of hooks 94. These hooks 94 extend upwardly from the lower portion 82, where an actuator 96 is operable to move them from a latched to an unlatched position.

Referring again to FIG. 1, it can be seen that the front actuation mechanism 26 is in the latched position, with the multilink hinge mechanism in the retracted or non-articulated position. Likewise, the rear articulation mechanism 26 is in the latched position and the multilink hinge is in the retracted or non-articulated position. In FIG. 2, with the decklid 14 in the luggage receiving position, the front articulation mechanisms are in the latched position, wherein the upper and lower portions are latchedly interconnected, and the multilink hinge is in the extended position such that the decklid 14 pivots upwardly and the rearward end 18 moves away from the body. The rear articulation system is in the unlatched position and the upper portion 50 is separated from the lower portion 52. The multilink hinge mechanism that forms part of the lower portion 52 is preferably in the retracted position. In FIG. 3, with the decklid 14 shown in the top receiving position, the front articulation mechanism 24 is in the unlatched position, with the upper portion 30 and lower portion 32 being separated. The multilink hinge mechanism that forms part of the upper 30 is preferably in the retracted position, and may be held in this position by the locking actuator, as discussed previously. The rear articulation mechanism 26 is in the latched position, with the hinge being articulated to the extended position. Therefore, the decklid 14 pivots rearwardly and the forward end 16 of the decklid 14 moves away from the body.

The design presented herein provides a decklid 14 without any type of frame, as that term is used in this field. That is, no auxiliary frame is used for supporting the decklid 14 in any of the three illustrated positions.

As will be clear to those of skill in the art, the disclosed embodiments of the present invention may be altered in various ways without departing from the scope or teaching of the present invention. Therefore, the present disclosure should be interpreted broadly. It is the following claims, including all equivalents, which define the scope of the present invention.

I claim:

1. A frameless articulating decklid system for a vehicle having a body and a retractable roof selectively covering a passenger compartment disposed in the body, the vehicle further having a luggage storage compartment positioned rearward of the passenger compartment and disposed in the body, the luggage compartment having a forward end and a rearward end, the system comprising;

a decklid having a forward end and a rearward end;

a front articulation mechanism having an upper portion interconnected with the forward end of the decklid and a lower portion interconnected with the vehicle body, the front articulation mechanism having a latched position wherein the upper and lower portions are latchedly interconnected and an unlatched position wherein the upper and lower portions are separable, the upper portion comprising a multilink hinge having a retracted position and an extended position;

a rear articulation mechanism having an upper portion interconnected with the rearward end of the decklid and a lower portion interconnected with the vehicle body, the rear articulation mechanism having a latched position wherein the upper and lower portions are latchedly interconnected and an unlatched position wherein the upper and lower portions are separable, the lower portion comprising a multilink hinge having a retracted position and an extended position;

the decklid system having a first closed position wherein the front and rear articulation mechanism is in the latched position, the forward end of the decklid is adjacent the forward end of the luggage compartment, and the rearward end of the decklid is adjacent the rearward end of the luggage compartment;

the decklid system having a second top receiving position wherein the front articulation mechanism is in the unlatched position and the rear articulation mechanism is in the latched position, the multilink hinge of the rear articulation mechanism being in the extended position such that the forward end of the decklid is spaced from the vehicle body so as to define a generally forward facing opening to receive the retractable roof therethrough; and the decklid having a third luggage receiving position wherein the front articulation mechanism is in the latched position and the rear articulation mechanism is in the unlatched position, the multilink hinge of the front articulation mechanism being in the extended position such that the rearward end of the decklid is spaced from the vehicle body so as to define a generally rearward facing opening to receive luggage therethrough;

wherein the decklid system does not include a separate frame interconnecting the decklid with the body.

2. The frameless articulating decklid system according to claim 1, wherein the multilink hinge of the front articulation mechanism comprises a 6 bar mechanism and the multilink hinge of the rear articulation mechanism comprises a 4 bar mechanism.

3. The frameless articulating decklid system according to claim 1, wherein the decklid is single piece lid.

4. The frameless articulating decklid system according to claim 1, wherein the front articulation mechanism includes an actuator for moving the hinge mechanism between the retracted and extended positions.

5. The frameless articulating decklid system according to claim 4, wherein when the system is in the second top receiving position, the actuator retains the multilink hinge of the front articulation mechanism in the retracted position.

6. The frameless articulating decklid system according to claim 1, further comprising a second front articulation mechanism having an upper portion interconnected with the forward end of the decklid and a lower portion interconnected with the vehicle body, the second front articulation mechanism having a latched position wherein the upper and lower portions are latchedly interconnected and an unlatched position wherein the upper and lower portions are separable, the upper portion comprising a multilink hinge having a retracted position and an extended position.

7. An articulating decklid system for a vehicle having a body and a retractable roof selectively covering a passenger compartment disposed in the body, the vehicle further having a luggage storage compartment positioned rearward of the passenger compartment and disposed in the body, the luggage compartment having a forward end and a rearward end, the system comprising;

a decklid having a forward end and a rearward end;

a pair of front articulation mechanisms each having an upper portion interconnected with the forward end of the decklid and a lower portion interconnected with the vehicle body, the front articulation mechanisms each having a latched position wherein the upper and lower portions are latchedly interconnected and an unlatched position wherein the upper and lower portions are separable, the front articulation mechanisms each including a multilink hinge having a retracted position and an extended position;

a rear articulation mechanism having an upper portion interconnected with the rearward end of the decklid and a lower portion interconnected with the vehicle body, the rear articulation mechanism having a latched position wherein the upper and lower portions are latchedly interconnected and an unlatched position wherein the upper and lower portions are separable, the rear articulation mechanism including a multilink hinge having a retracted position and an extended position;

the decklid system having a first closed position wherein the front and rear articulation mechanisms are each in the latched position, the forward end of the decklid is adjacent the forward end of the luggage compartment, and the rearward end of the decklid is adjacent the rearward end of the luggage compartment;

the decklid system having a second top receiving position wherein the front articulation mechanisms are in the unlatched position and the rear articulation mechanism is in the latched position, the multilink hinge of the rear articulation mechanism being in the extended position such that the forward end of the decklid is spaced from the vehicle body so as to define a generally forward facing opening to receive the retractable roof therethrough; and the decklid having a third luggage receiving position wherein the front articulation mechanisms are in the latched position and the rear articulation mechanism is in the unlatched position, the multilink hinge of each of the front articulation mechanisms being in the extended position such that the rearward end of the decklid is spaced from the vehicle body so as to define a generally rearward facing opening to receive luggage therethrough.

8. The articulating decklid system according to claim 7, wherein the multilink hinge of each of the front articulation mechanisms forms part of the upper portion and the multilink hinge of the rear articulation mechanism forms part of the lower portion.

9. The articulating decklid system according to claim 7, wherein the multilink hinge of each of the front articulation mechanisms comprises a 6 bar mechanism and the multilink hinge of the rear articulation mechanism comprises a 4 bar mechanism.

10. The articulating decklid system according to claim 7, wherein the decklid is single piece lid.

11. The articulating decklid system according to claim 7, wherein the front articulation mechanisms each include an actuator for moving the hinge mechanism between the retracted and extended positions.

12. The articulating decklid system according to claim 7, wherein when the system is in the second top receiving position, the actuators retain the multilink hinge of each front articulation mechanisms in the retracted position.

13. A frameless articulating decklid system for a vehicle having a body and a retractable roof selectively covering a passenger compartment disposed in the body, the vehicle further having a luggage storage compartment positioned rearward of the passenger compartment and disposed in the body, the luggage compartment having a forward end and a rearward end, the system comprising;

a decklid having a forward end and a rearward end;

a pair of front articulation mechanisms each having an upper portion interconnected with the forward end of the decklid and a lower portion interconnected with the vehicle body, the front articulation mechanisms each having a latched position wherein the upper and lower portions are latchedly interconnected and an unlatched position wherein the upper and lower portions are separable, the front articulation mechanisms each including a hinge having an articulated position and a non-articulated position;

a rear articulation mechanism having an upper portion interconnected with the rearward end of the decklid and a lower portion interconnected with the vehicle body, the rear actuation mechanism having a latched position wherein the upper and lower portions are latchedly interconnected and an unlatched position wherein the upper and lower portions are separable, the rear articulation mechanism including a multilink hinge having a retracted position and an extended position;

the decklid system having a first closed position wherein the front and rear articulation mechanisms are each in the latched position, the forward end of the decklid is adjacent the forward end of the luggage compartment, and the rearward end of the decklid is adjacent the rearward end of the luggage compartment;

the decklid system having a second top receiving position wherein the front articulation mechanisms are in the unlatched position and the rear articulation mechanism is in the latched position, the multilink hinge of the rear articulation mechanism being in the extended position such that the forward end of the decklid is spaced from the vehicle body so as to define a generally forward facing opening to receive the retractable roof therethrough; and the decklid having a third luggage receiving position wherein the front articulation mechanisms are in the latched position and the rear articulation mechanism is in the unlatched position, the hinge of each of the front articulation mechanisms being in the articulated position such that the rearward end of the decklid is spaced from the vehicle body so as to define a generally rearward facing opening to receive luggage therethrough;

wherein the decklid system does not include a separate frame interconnecting the decklid with the body.

14. The articulating decklid design according to claim 13, wherein the multilink hinge of each of the front articulation mechanisms forms part of the upper portion and the multilink hinge of the rear articulation mechanism forms part of the lower portion.

15. The frameless articulating decklid design according to claim 13, wherein the multilink hinge of each of the front articulation mechanisms comprises a 6 bar mechanism and the multilink hinge of the rear articulation mechanism comprises a 4 bar mechanism.

16. The frameless articulating decklid system according to claim 13, wherein the decklid is single piece lid.

17. The frameless articulating decklid system according to claim 13, wherein the front articulation mechanisms each include an actuator for moving the hinge mechanism between the retracted and extended positions.

18. The frameless articulating decklid system according to claim 17, wherein when the system is in the second top receiving position, the actuators retain the multilink hinge of each front articulation mechanisms in the retracted position.

19. A frameless articulating decklid system for a vehicle having a body and a retractable roof selectively covering a passenger compartment disposed in the body, the vehicle further having a luggage storage compartment positioned rearward of the passenger compartment and disposed in the body, the luggage compartment having a forward end and a rearward end, the system comprising;

a decklid having a forward end and a rearward end;

a pair of front articulation mechanisms each having an upper portion interconnected with the forward end of the decklid and a lower portion interconnected with the vehicle body, the front articulation mechanisms each having a latched position wherein the upper and lower portions are latchedly interconnected and an unlatched position wherein the upper and lower portions are separable, the front articulation mechanisms each including a multilink hinge having a retracted position and an extended position;

a rear articulation mechanism having an upper portion interconnected with the rearward end of the decklid and a lower portion interconnected with the vehicle body, the rear articulation mechanism having a latched position wherein the upper and lower portions are latchedly interconnected and an unlatched position wherein the upper and lower portions are separable, the rear articulation mechanism including a hinge having an articulated position and a non articulated position;

the decklid system having a first closed position wherein the front and rear articulation mechanisms are each in the latched position, the forward end of the decklid is adjacent the forward end of the luggage compartment, and the rearward end of the decklid is adjacent the rearward end of the luggage compartment;

the decklid system having a second top receiving position wherein the front articulation mechanisms are in the unlatched position and the rear articulation mechanism is in the latched position, the hinge of the rear articulation mechanism being in the articulated position such that the forward end of the decklid is spaced from the vehicle body so as to define a generally forward facing opening to receive the retractable roof therethrough; and the decklid having a third luggage receiving position wherein the front articulation mechanisms are in the latched position and the rear articulation mechanism is in the unlatched position, the multilink hinge of each of the front articulation mechanisms being in the extended position such that the rearward end of the decklid is spaced from the vehicle body so as to define a generally rearward facing opening to receive luggage therethrough;

wherein the decklid system does not include a separate frame interconnecting the decklid with the body.

20. The articulating decklid system according to claim 19, wherein the multilink hinge of each of the front articulation mechanisms forms part of the upper portion and the hinge of the rear articulation mechanism forms part of the lower portion.

21. The frameless articulating decklid system according to claim 19, wherein the multilink hinge of each of the front articulation mechanisms comprises a 6 bar mechanism and the hinge of the rear articulation mechanism comprises a 4 bar mechanism.

22. The frameless articulating decklid system according to claim 19, wherein the decklid is single piece lid.

23. The frameless articulating decklid system according to claim 19, wherein the front articulation mechanisms each include an actuator for moving the hinge mechanism between the retracted and extended positions.

24. The frameless articulating decklid system according to claim 23, wherein when the system is in the second top receiving position, the actuators retain the hinge of each front articulation mechanisms in the retracted position.

* * * * *

UNITED STATES PATENT AND TRADEMARK OFFICE
CERTIFICATE OF CORRECTION

PATENT NO.   : 6,799,788 B2
DATED        : October 5, 2004
INVENTOR(S)  : Frank Plesternings It is certified that error appears in the above-identified patent and that said Letters Patent is hereby corrected as shown below:

Title page,
Item [56], References Cited, U.S. PATENT DOCUMENTS, please insert the following:

| Patent No. | Date | Patentee | Kind | Class | Subclass |
|---|---|---|---|---|---|
| 1253641 | 1918-01-15 | Steele | | 16 | 222 |
| 1774199 | 1930-08-26 | Good | | 296 | 76 |
| 1933623 | 1933-11-07 | Gordan | | 296 | 76 |
| 2181869 | 1939-12-05 | Carr | | 296 | 107.2 |
| 2947570 | 1960-08-02 | Noe | | 296 | 117 |
| 3021174 | 1962-02-13 | Rund | | 296 | 107.2 |
| 3180677 | 1965-04-27 | Scott | | 296 | 107.2 |
| 5551743 | 1996-09-03 | Klein | | 296 | 76 |
| 5765895 | 1998-06-16 | Rose | | 296 | 76 |
| 5775766 | 1998-07-07 | Schaible | | 296 | 107.09 |
| 5823606 | 1998-10-20 | Schenk | | 296 | 107.08 |
| 5967593 | 1999-10-19 | Schuler | | 296 | 136.06 |
| 6010178 | 2000-01-04 | Hahn | | 296 | 107.08 |
| 6062628 | 2000-05-16 | Guillez | | 296 | 107.08 |
| 6073988 | 2000-06-13 | Huber | | 296 | 116 |
| 6092335 | 2000-07-25 | Queveau | | 49 | 192 |
| 6145915 | 2000-11-14 | Queveau | | 296 | 107.08 |
| 6164713 | 2000-12-26 | Graf | | 296 | 107.08 |
| 6186577 | 2001-02-13 | Guckel | | 296 | 107.07 |
| 6193300 | 2001-02-27 | Nakatomi | | 296 | 107.08 |
| 6250707 | 2002-06-26 | Dintner | | 296 | 76 |
| 6270144 | 2001-08-07 | Schenk | | 296 | 107.08 |
| 6325445 | 2001-12-04 | Schenk | | 296 | 107.08 |
| 6352298 | 2002-03-05 | Hayashi | | 296 | 107.08 |
| 6357815 | 2002-03-19 | Queveau | | 296 | 76 |
| 6464282 | 2002-10-15 | Ellermann | | 296 | 70 |
| 6572157 | 2003-06-03 | Kaute | | 292 | 201 |
| 6578899 | 2003-06-17 | Hasselgruber | | 296 | 107.08 |
| 6585307 | 2003-07-01 | Queveau | | 296 | 76 |
| 6604775 | 2003-08-12 | Obendiek | | 296 | 108 |
| 6619720 | 2003-09-16 | Necastri | | 296 | 107.08 |

Page 1 of 2

UNITED STATES PATENT AND TRADEMARK OFFICE
CERTIFICATE OF CORRECTION

PATENT NO. : 6,799,788 B2
DATED : October 5, 2004
INVENTOR(S) : Frank Plesternings It is certified that error appears in the above-identified patent and that said Letters Patent is hereby corrected as shown below:

Title page (cont'd),

| | | | | |
|---|---|---|---|---|
| 6619720 | 2003-09-16 | Necastri | 296 | 107.08 |
| 6296295 | 2001-10-02 | Jambor et al. | 296 | 107.7 |
| 6257648 | 2001-07-01 | Schenk | 296 | 107.07 |
| 6217104 | 2001-04-17 | Neubrand | 296 | 108 |
| 6123381 | 2000-09-26 | Schenk | 296 | 107.07 |
| 5967591 | 1999-10-19 | Muehlhausen | 296 | 107.16 |
| 5944378 | 1999-08-31 | Mather et al. | 296 | 219 |
| 5746470 | 1998-05-08 | Seel et al. | 296 | 108 |
| 5649733 | 1997-07-22 | Seel et al. | 296 | 37.5 |
| 5520432 | 1996-05-28 | Gmeiner et al. | 296 | 107.01 |
| 4650241 | 1987-03-17 | Motonami et al. | 296 | 203.03 |
| 6595572 | 2003-07-22 | Schuler et al. | 296 | 107.08 |
| 6511118 | 2003-01-28 | Liedmeyer | 296 | 107.17 |

Item [57], ABSTRACT,
Line 1, before "mechanisms..." insert -- A frameless articulating decklid system includes a pair of front articulation --

Signed and Sealed this

Twenty-eighth Day of June, 2005

JON W. DUDAS
*Director of the United States Patent and Trademark Office*